United States Patent [19]
Keighley

[11] 3,856,247
[45] Dec. 24, 1974

[54] FASTENING MEANS
[75] Inventor: Neville Keighley, Clitheroe, England
[73] Assignee: D. T. & N. Keighley (Whalley) Limited, Lancashire, Great Britain
[22] Filed: May 2, 1973
[21] Appl. No.: 356,520

[30] Foreign Application Priority Data
May 3, 1972 Great Britain.................... 20507/72

[52] U.S. Cl................ 248/154, 85/1 H, 105/366 E, 248/361 R
[51] Int. Cl........ B61d 45/00, B65j 1/22, B60p 3/32
[58] Field of Search............ 248/154, 361 R, 119 R; 105/369 A, 366 C, 366 E; 280/179 R; 296/35 A, 23 MC; 206/46 M; 85/1 H

[56] References Cited
UNITED STATES PATENTS
1,495,442  5/1924  Rosencrans..................... 280/179 R
1,552,702  9/1925  Irish.............................. 85/1 H UX
1,867,352  7/1932  Churgay et al........... 105/369 A UX
2,128,364  8/1938  Kellett............................. 105/366 C
2,673,068  3/1954  Schinker...................... 280/179 R X
3,140,671  7/1964  Kozak et al...................... 105/366 C
3,671,003  6/1972  Henson........................... 248/361 R
3,701,562  10/1972  Carr............................ 105/366 C X
3,709,455  1/1973  Last............................ 105/369 A X
3,774,551  11/1973  Sweger............................ 105/366 C Primary Examiner—J. Franklin Foss
Attorney, Agent, or Firm—James E. Nilles

[57] ABSTRACT

A fastener for removably fastening a shipping container to a vehicle platform and having a body part with an adjustable twist-lock spigot for engaging a lateral opening in the container and a clamp for tightening the body part securely to the vehicle platform, the clamp acting via the spigot. Safety devices are provided to prevent inadvertent release of the fastener.

7 Claims, 5 Drawing Figures

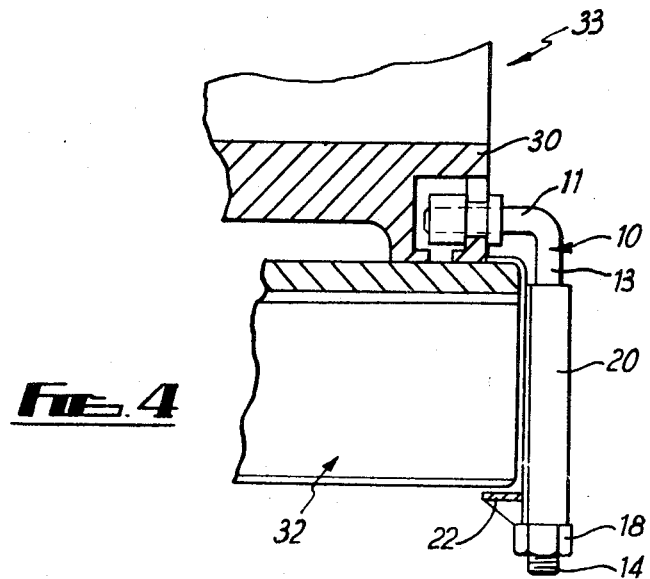
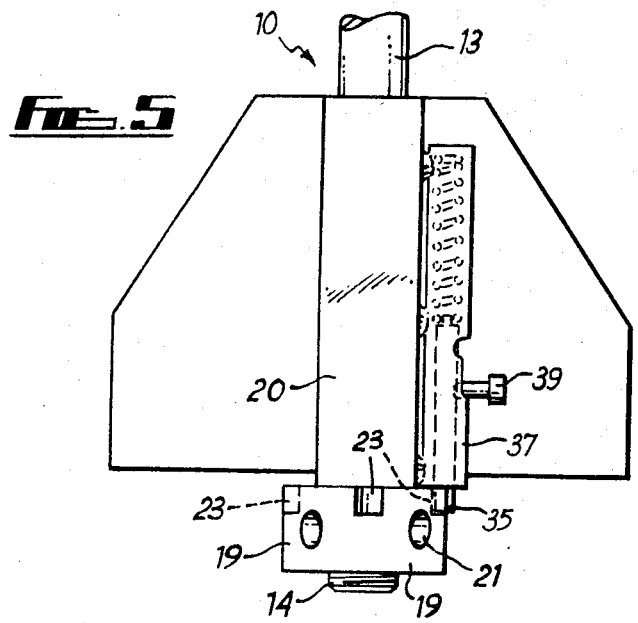

FASTENING MEANS

BACKGROUND OF THE INVENTION

1. Field of the Invention

The present invention relates to fastening means and to a fastener for removable fastening a shipping container to a support structure such as a vehicle platform.

2. Description of the Prior Art

Standarized shipping containers are provided with box-section members at their lower corners. Such box-section members have an opening in their base by which the container may be clamped to a vehicle platform which must be specially adapted by the provision of fasteners, engageable in said openings, to mount the container. Such fasteners are integrally formed with the vehicle platform and typically 16 are provided per vehicle so that containers of various standard sizes can be accepted. As an alternative to fasteners, ropes and chains have been used to secure containers on platforms but such a practice is generally undesirable and cumbersome.

In addition to said openings in the bases of the box-section members, lateral openings, which are non-circular, are provided in the outwardly facing sides of the box-section members. These lateral openings serve as engagement points for lifting apparatus.

SUMMARY OF THE INVENTION

The present invention provides a fastener whereby lateral openings in a container may be employed in clamping a shipping container to a support structure such as a vehicle platform and especially to a platform which is not equipped with fasteners for engaging the base opening of such containers.

According to the present invention, a fastener for removably fastening a shipping container to a support structure such as to the top-side of a vehicle platform comprises:

a. a body member having, at one end, means for engagement, retention and abutment of that end in the lateral opening of the container;

b. an abutment member movable on the body member to form an abutment, opposed to the abutment of said end of the body member;
and c. means for causing the abutment member to be moved on the body member towards said end of the body member to clamp the container at said lateral opening onto the support structure and to retain the abutment member in the clamping position.

DESCRIPTION OF THE DRAWINGS

FIG. 4 shows the fastener, on a reduced scale, clamping a shipping container to a vehicle platform, and FIG. 5 is a view similar to that of FIG. 2 showing a modification.

DESCRIPTION OF A PREFERRED EMBODIMENT

Figure 1:
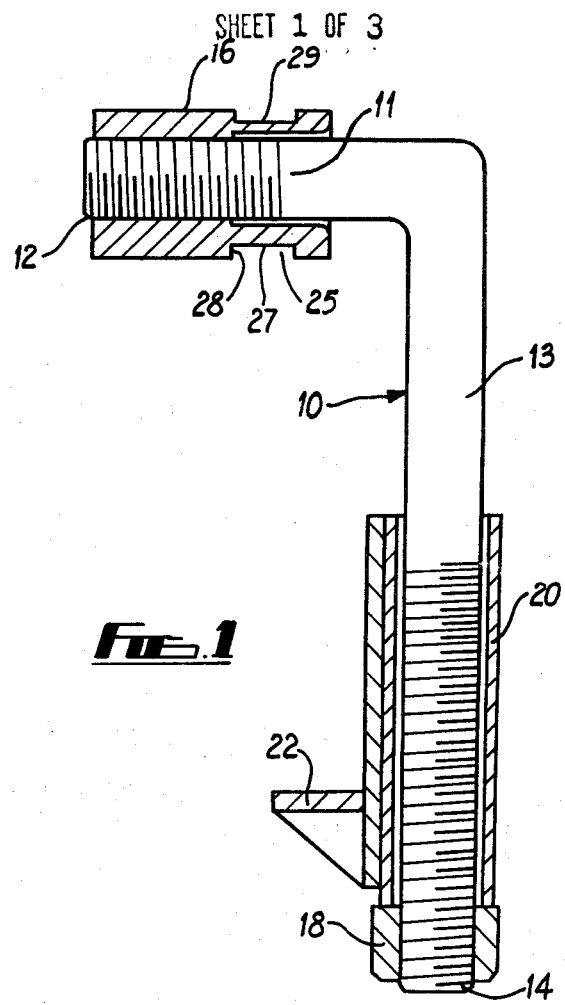
FIG. 1 is a sectioned side elevation of a fastener constructed in accordance with one embodiment of the invention.

The fastener comprises a body member 10 which may be bent from bar stock or, preferably, drop-forged in a right-angled configuration to have a short horizontal leg 11 and a long vertical leg 13. The two ends of the body member 10 are screw-threaded at 12 and 14 and receive a twist-lock spigot 16 and nut 18 respectively. A box-shaped sleeve 20, which is part of an abutment member is slideably positioned around the body member 10 and is movable along the body member by the nut 18. An abutment bracket 22 projects from and is secured by welding to the sleeve 20.

Figure 3:
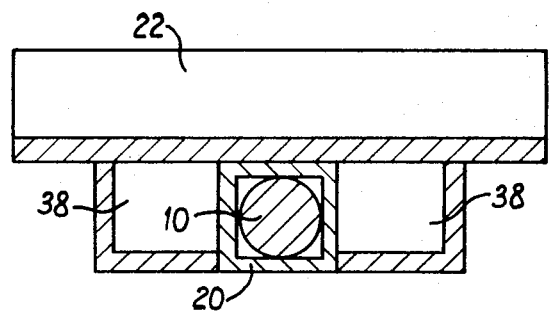
FIG. 3 is a section on the line III—III in FIG. 2.
Figure 2:
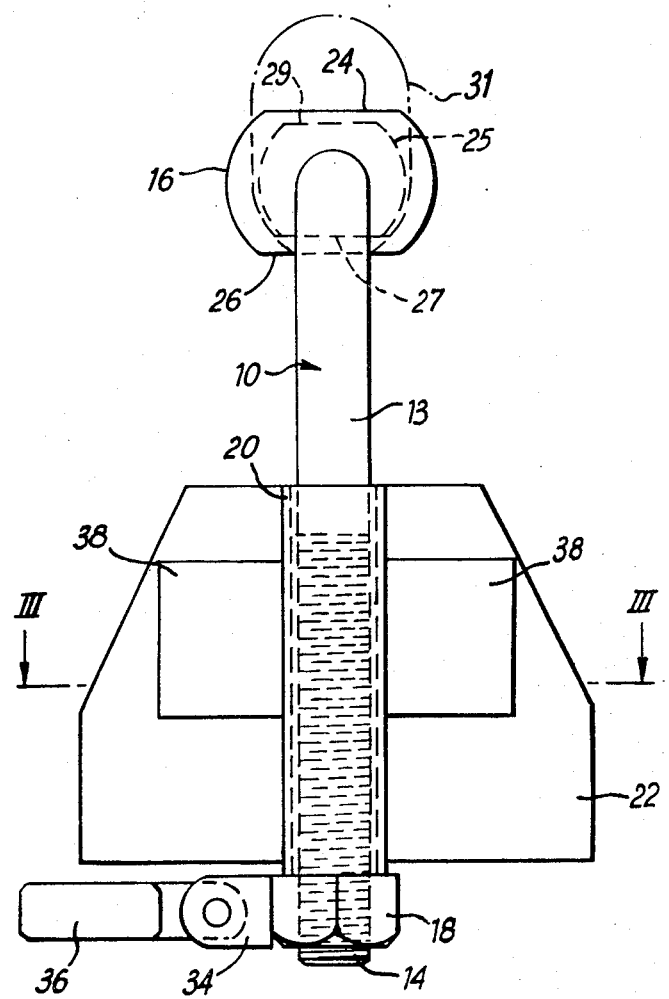
FIG. 2 is an end elevation of the fastener of FIG. 1.

The spigot 16 is of non-circular, elongate shape (FIG. 2), two opposed flats 24, 26 being horizontal in the operative position of the fastener. The spigot also has a groove 25 with two flats 27 and 29, the flat 29 forming an abutment. The spigot engages in a lateral opening 31 in the base 30 of a container 33, the opening having a similar shape to that of the spigot but is elongate in the vertical direction. Thus, to connect the fastener to the container, the spigot 16 is turned through 90° from the position shown in FIG. 2, the spigot is passed into the opening 31 and the spigot is turned into the position of FIG. 2 to locate a shoulder 28 of the groove 25 behind the opening and engage the fastener and restrain it against withdrawal from the opening 31. In the operative position of the fastener, the base 30 is adjacent to the lower flat 27 whereby the spigot 16 cannot be rotated in the opening 31 without first lifting the fastener with respect to the opening. The spigot 16 therefore cannot be unscrewed from the body member 10 when the fastener is in use. The spigot 16 is adjustable on the screw thread 12 to accommodate the width of a platform 32 to the width of the container 33.

when the container is properly positioned on the vehicle platform 32 and fasteners are supported in the openings 31 in the container, the container is clamped to the platform by locating the abutment bracket 22 beneath the platform and turning the nut 18 to raise the bracket. The nut 16 carries an appendage 34 to which is pivoted an arm 36. An extension tube (not shown) may be positioned over the arm 36 to assist the application of a high torque to the nut. When the nut is fully tightened, the extension tube in removed, the arm 36 is pivoted upwardly and the extension tube is passed downwardly through one or other of two pockets 38 (FIG. 3) associated with the bracket 22 back onto the arm 36. The nut 18 is thereby secured against rotation by a releasable lock.

In FIG. 5 an alternative arrangement of releasable lock is shown for securing the nut, now numbered 19. The nut 19 is of cylindrical form with apertures 21 for a torque applying bar. The nut also has recesses 23 at its upper periphery into which the nose 35 of a spring-loaded bolt 37 having a manipulating knob 39 can locate to secure the nut.

The fastener above described is suitable for use with containers of various length and, for any vehicle platform, only four fasteners need be provided. The actual positioning of the container on a platform is not critically related to the position occupied by fasteners as the fasteners themselves can occupy any position.

In general, the clamping force applied by tightening the nut 18 or 19 is quite adequate to retain the fastener securely in place on the platform and hence retain the container in place. However supplementary means may be provided for assisting the engagement of the abutment member with the platform. For example the abutment bracket may be roughened or spiked or have a ribbed surface to cooperate with a complementary grooved surface on the platform. Alternatively the platform itself may have spaced stops against which the abutment bracket 22 can locate to inhibit movement of the fasteners on the platforms.

I claim:

1. A fastener for removably fastening a shipping container to the top side of a vehicle platform, comprising: a body member of L-shape and having a short horizontal leg, a long vertical leg and also having screw threads at the ends of the legs; a spigot defining a peripheral recess rotatable on the thread of the short leg, so that the location of the recess can be adjusted lengthwise of the short leg; a sleeve member movable along the long leg and having an abutment bracket extending therefrom in the same direction as that of the short leg, said bracket defining a surface to engage the underside of the vehicle platform; and nut means engaging the screw thread of the long leg and acting on the lower end of the sleeve member, to move the sleeve member along the long leg and hence adjust the location of the bracket lengthwise of the long leg.

2. A combination of claim 1 and further comprising lock means forming part of said nut means for preventing rotation of the latter relative to said long leg.

3. A fastener as claimed in claim 1 in which said nut means incorporates means for assisting the application of a high torque to the nut.

4. A fastener as claimed in claim 1 in which said abutment member has supplementary means for assisting the engagement of said abutment member with said support structure when the container is clamped to the support structure.

5. A fastener as set forth in claim 1 in combination with a shipping container having outwardly facing lateral openings, said fastener being engaged, retained and abutted in said openings and clamping said containers to the platform of a transport vehicle.

6. The combination set forth in claim 5 in which said abutment member is engageable with the underside of said platform for all positions of said container longitudinally of said frame.

7. A method of fastening a shipping container having corner castings with underside fastening openings and outwardly facing lateral lifting openings to the platform of a transport vehicle comprising, the steps of engaging, retaining, and abutting fasteners in said lateral openings and clamping the container by said fasteners at said lateral openings to adjacent portions at the underside of said platform.

* * * * *